July 27, 1965     W. D. EMERSON     3,196,885
CORN AND CALLOUS FILE
Filed Feb. 16, 1962

INVENTOR.
WILLIAM D. EMERSON
BY
ATTORNEYS

United States Patent Office 3,196,885
Patented July 27, 1965

3,196,885
CORN AND CALLOUS FILE
William D. Emerson, Canoga Park, Calif., assignor to The Scholl Mfg. Co., Inc., Chicago, Ill., a corporation of New York
Filed Feb. 16, 1962, Ser. No. 173,632
1 Claim. (Cl. 132—76.4)

This invention relates to improvements in a corn and callous file, and more particularly to an abrasive instrument highly desirable for the reduction of corn and callous tissue, horny indurations, tubercles, hypertrophy, and similar afflictions, which afflictions most frequently occur on the hands and feet, although the invention may have other uses and purposes as will be apparent to one skilled in the art.

In the past, many and various types of abrasive instruments for the reduction of excess and undesirable body tissue have been developed. In most instances, however, these formerly known devices were merely flat blade or spatula like members carrying an abrasive on the surface thereof, and which required careful and tedious manipulation, particularly at the sides and tops of the toes and similar locations difficult of access, and long and tiresome manipulation in the case of a relatively large callosity. Difficulty was accordingly experienced in avoiding injury to healthy tissue adjacent the particular affliction being treated. This was mainly because the instrument was not shaped to fit contours of the foot or hand, and was not shaped to provide selective application of a small abrasive surface against the body or a large abrasive surface against the body. In many cases, also, instruments of this type heretofore made could not be firmly and positively held in the hand and still manipulated properly in locations difficult of access.

With the foregoing in mind, it is an important object of the instant invention to provide an instrument of the character of a corn and callous file having a distinctive shape whereby it may be easily and adequately maneuvered by virtue of its fitting the contours of the hands and feet.

Another object of the instant invention is the provision of a corn and callous file having an extended working portion longitudinally concave on one side and longitudinally convex on the opposite side, whereby both small and large abrasive contact areas are selectively available.

Also a feature of this invention is the provision of a corn and callous file having an elongated working portion concave on one side, and convex on the opposite side with the convexity longitudinally of the working portion being far less arcuate than the transverse convexity.

A further feature of the instant invention is the provision of a corn and callous file comprising an elongated working portion with a shaped handle generally in line with the working portion, the working portion having generally the shape of a cylinder decreasing in diameter toward both ends thereof, with one side cut away in the form of a longitudinal arc providing a concavity to a depth substantially on the longitudinal axis of the handle.

While some of the more salient features, characteristics and advantages of the instant invention have been above pointed out, others will become apparent from the following disclosures, taken in conjunction with the accompanying drawing, in which.

As shown on the drawings.

The illustrated embodiment of the instant invention includes a handle 1, transversely circular, and tapering inwardly to a narrower neck 2, whereby the handle may be easily, comfortably, and firmly grasped by the user. The handle may be made of any suitable or desirable material, such as wood, bone, thermoplastic, thermosetting plastic, or other material that is firm and stable and pleasing in appearance.

Preferably integral with the handle is a working end 3 which is entirely coated or covered with an abrasive material 4. This abrasive material may satisfactorily be white fused aluminum oxide, which is clean looking, has excellent abrasive qualities, and is highly durable. The oxide particles may be mixed with a suitable waterproof bonding agent, the working end 3 functioning as a core and covered in any suitable manner with the abrasive material, which may then be baked upon the working end 3 of the device at a temperature of approximately 280° F. to harden and set the material.

Figure 1:
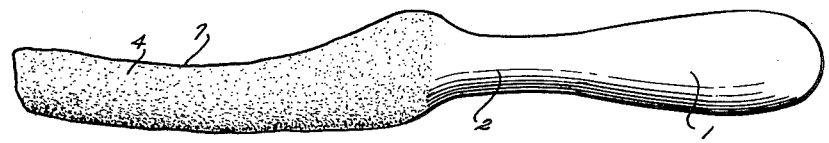
FIGURE 1 is a side elevational view of a corn and callous file embodying principles of the instant invention.
Figure 2:
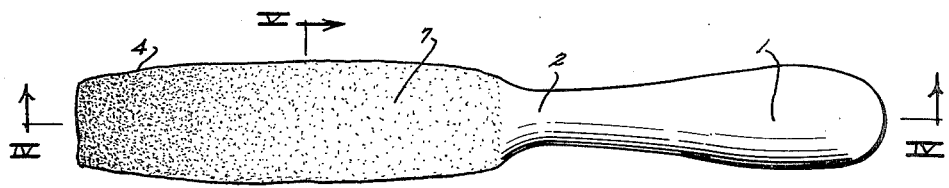
FIGURE 2 is a top plan view of the structure of FIGURE 1.
Figure 3:
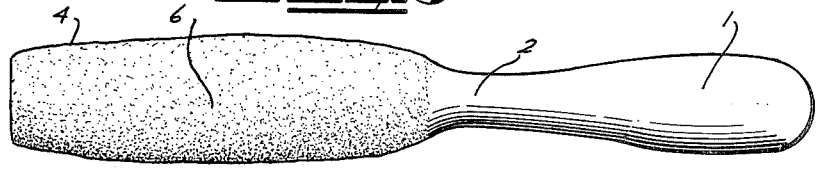
FIGURE 3 is a bottom plan view of the structure of FIGURE 1.
Figure 4:
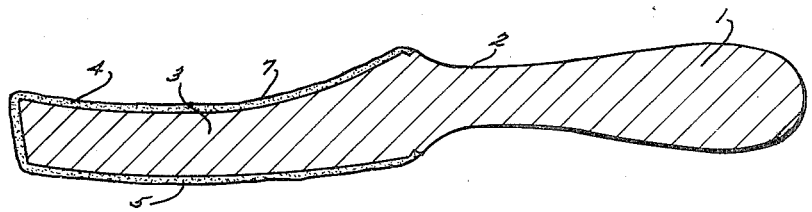
FIGURE 4 is a longitudinal vertical sectional view taken substantially as indicated by the line IV—IV of FIGURE 2, looking in the direction of the arrows.
Figure 5:
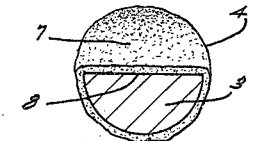
FIGURE 5 is a transverse vertical sectional view taken substantially as indicated by the line V—V of FIGURE 2.

The abrasive material 4 is applied to the working end or core 3 of the structure substantially evenly thereover so that the abrasive itself will assume the shape of the portion 3. The shape of the working end of the device is a highly important feature of the instant invention. It will be noted that the working end of the device has a curvature as indicated at 5 in FIGURE 4 rendering one side of the device longitudinally convex. Transversely, however, the working end curves much sharper and preferably substantially follows a portion of the circumference of a circle, as indicated at 6. On the opposite side, the working end of the device is longitudinally concave as shown at 7, the maximum depths of the concavity, as seen in FIGURE 4, being to a point approximating the longitudinal axis of the handle 1 or even a trifle lower. While this portion of the device is longitudinally concave, the original shaping is such that transversely there is a straight line, as indicated at 8 in FIGURE 5, all along the concave face.

The general shape and contour of the working end of the device gives the instant invention great versatility in use. Both very small and broad areas of contact with the body of the user can readily be had. For example, a corn or callosity of a relatively small size on the side or top of a toe can be easily reduced with a minute area of abrasive contact and this can be readily had on the convex side of the device where the contact will be substantially point-like in character, depending upon the pressure used. On the other hand, where there is a large callosity on the side of a heel or in some similar location a broad area of contact may readily be provided with the concave side of the device. Even the very tip of the device may be utilized, if desired, and the handle turned or spun in the hands of the operator.

The contour of the working end of the device, or some portion thereof, will substantially fit an area of corn or callous tissue, substantially regardless of where the particular area is located, with the possible exception of a corn between the toes. At least one region of the structure will satisfy to really fit a corn or callous for easy and positive abrasive action, and without danger of injuring adjacent healthy tissue. At the same time, the device is very easily and firmly held so as to provide accurate manipulation without undue tediousness and care in the application.

It will also be noted that the instant invention is pleasing in appearance, relatively light in weight, and extremely long lived, since the abrasive material will afford the same abrasive action and effect even after some surface removal, since it is uniform throughout its thickness.

It will be understood that modifications and variations may be effected without departing from the scope of the novel concepts of the present invention.

I claim as my invention:

A corn and callous file comprising
(a) a handle,
(b) a working element connected to said handle,
(c) a coating of abrasive material of substantially uniform thickness on said working element, and
(d) said element being longitudinally convex and transversely convex at a sharper curvature on one side, and longitudinally concave and transversely straight on the other side, and
(e) said element having a square cut end of the thickness of the element also coated with abrasive.

References Cited by the Examiner

UNITED STATES PATENTS

| | | | |
|---|---|---|---|
| 132,468 | 10/72 | Jacobsohn | 132—76.4 |
| 448,409 | 3/91 | Cassidy. | |
| 454,956 | 6/91 | Levy | 132—76.4 |
| 778,640 | 12/04 | Forquignon | 132—76.4 |
| 1,586,441 | 5/26 | Blom | 132—76.4 |
| 2,450,207 | 9/48 | Silverman | 132—76.4 |
| 3,131,701 | 5/64 | Emerson | 132—76.4 |

FOREIGN PATENTS

| | | |
|---|---|---|
| 501,946 | 2/20 | France. |
| 750,949 | 6/33 | France. |

RICHARD A. GAUDET, *Primary Examiner.*

LOUIS J. DEMBO, *Examiner.*